Jan. 7, 1941.   P. K. SAUNDERS   2,227,914
DIAPHRAGM VALVE
Filed July 19, 1939
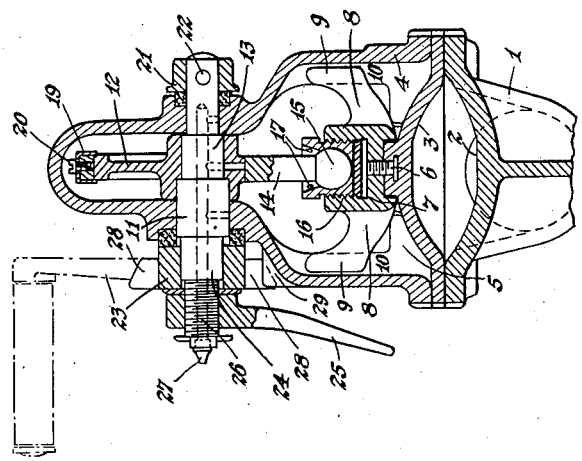
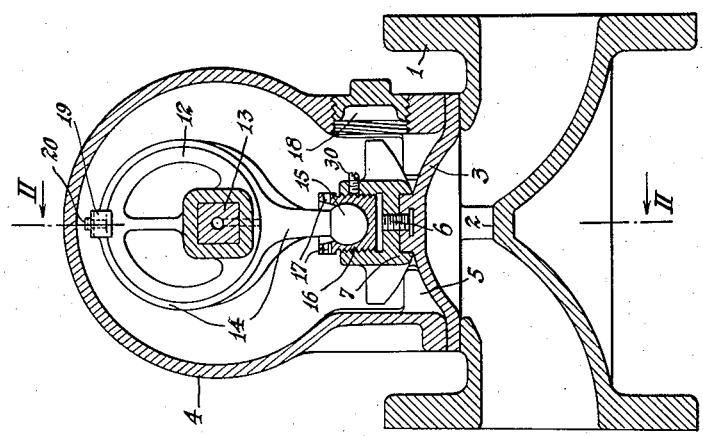
INVENTOR
Philip K. Saunders
BY
ATTORNEY

UNITED STATES PATENT OFFICE 2,227,914

DIAPHRAGM VALVE

Philip Keith Saunders, Cwmbran, near Newport, England

Application July 19, 1939, Serial No. 285,430
In Great Britain August 15, 1938

5 Claims. (Cl. 251—24)

This invention relates to diaphragm valves. In particular the invention is concerned with that kind of valve in which the body has a substantially straight through bore intersected by a shallow weir which forms a seating for the diaphragm whose periphery is clamped between the circumferential flange of an opening in the side of the body opposite the weir and a casing or bonnet which accommodates the valve actuating gear.

A principal object of the invention is to provide a simple operating mechanism which may be used on practically all sizes of valves both for quick acting and also for power operated valves.

A further object is to provide a convenient method of adjusting the limiting positions of quick acting valves without dissembling the valve operating mechanism.

With these and other objects in view according to this invention the diaphragm is moved by a connecting rod controlled by a crank or eccentric rotating about an axis parallel with the plane of attachment of the diaphragm; that is to say, parallel with the plane of the circumferential flange surrounding the opening in the side of the body across which the diaphragm is mounted.

Further features of the invention will become apparent from the detailed description of one embodiment thereof illustrated in the accompanying drawing in which:

Fig. 1 is a side elevation in section of a quick acting diaphragm valve in accordance with the invention.

Fig. 2 is a section on the line II—II of Fig. 1.

The body 1 of the valve illustrated has the usual weir 2 intersecting the bore and having a concave face to form a seating for the diaphragm 3 which is clamped across an opening in the side of the body by the bonnet 4.

The bonnet 4 has the usual diaphragm supporting toes 5 cast in it. The diaphragm 3 is attached by the usual stud 6 to a diaphragm compressor 7 having the usual projecting finger inter-engaging with the toes 5. The two long fingers 8 in the plane of the weir 2 have thickened ends 9 which engage diametrically opposite grooves 10 in the sides of the bonnet.

A shaft 11 in the plane of the weir 2 and parallel with the plane of attachment of the diaphragm 3 is journalled in the bonnet. An eccentric 12 is mounted on a square part 13 of the shaft. An integral eccentric strap and connecting rod 14 has a ball end 15 which co-acts with a longitudinally split cylindrical ball socket 16 screwed centrally into the compressor 7. The ball socket 16 has a plurality of radial holes 17 which are accessible by removing the plug 18 in the side of the bonnet 4.

The eccentric strap 14 is held on the eccentric 12 by a U shaped part 19 attached by a screw 20 to the top of the strap 14 so that its arms overlap the eccentric on each side.

The shaft 11 has a collar 21 secured on one end by a pin 22. The operating handle 23 is mounted on a squared part 24 on the other end and secured by a clamping handle 25 screwed on to the threaded end 26 of the shaft.

A grease gun nipple 27 is provided for lubricating the bearings of the shaft 11 and the bearing between the eccentric 12 and its strap 14.

Movement of the handle 23 is limited by contact between one or other of the lugs 28 on it with the stop 29 on the bonnet. These lugs are arranged so that the eccentric is just past bottom dead centre when the handle is in the valve closing position. The ball joint is adjusted by removing the plug 18 and rotating the ball socket 16 by means of a tommy bar in the holes 17 until a tight closure is made with the valve closed. The ball joint may be locked in this position by the grub screw 30 threaded radially in the boss of the compressor 7 opposite the plug 18.

The diaphragm will be sufficiently compressible to allow the eccentric to be moved over bottom dead centre position to allow the operating handle to be moved to the fully closed position. In this position pressure on the diaphragm of the fluid controlled in no way tends to open the valve.

The valve may be held in any desired position intermediate the full open and full closed positions by screwing up the clamping handle 25.

Due to the thickened ends 9 of the fingers 8 on the diaphragm compressor there is no possibility of the latter member becoming jammed in the bonnet on account of the oblique thrust exerted on it by the connecting rod in certain positions.

What I claim is:

1. A diaphragm valve comprising a body with a substantially straight through bore intersected by a raised weir and having an opening opposite the weir, a diaphragm extending across the opening, a bonnet disposed above said diaphragm, a backing member for actuating the diaphragm, a crank shaft in the plane of the weir and parallel with the plane of attachment of the diaphragm journalled in said bonnet, and a connecting rod connected at one end to the crank and at the other end by a ball joint to the backing member.

2. A diaphragm valve comprising a body with a substantially straight through bore intersected by a raised weir and having an opening opposite the weir, a diaphragm extending across the opening, a bonnet disposed above said diaphragm, a backing member for actuating the diaphragm, a shaft in the plane of the weir and parallel with the plane of attachment of the diaphragm journalled in said bonnet, an eccentric on said shaft, an eccentric strap surrounding said eccentric, and a connecting rod connected at one end to the eccentric strap and at the other end by a ball joint to the backing member.

3. In a quick acting diaphragm valve, a diaphragm seating, a diaphragm, a diaphragm backing member, a lever operated shaft, an eccentric on said shaft, an eccentric strap surrounding said eccentric, a connecting rod from the eccentric strap to said backing member proportioned so that said diaphragm is pressed into tight contact with said weir in the bottom dead centre position, and an abutment stop limiting movement of the operating lever at a point when the eccentric is just past the bottom dead centre position.

4. In a crank operated diaphragm valve, a backing member with a central threaded hole on the side remote from the diaphragm, a crank shaft, a ball ended connecting rod connected at the end remote from the ball to the crank, and an externally threaded longitudinally split cylindrical ball socket co-acting with the ball end of the connecting rod screwed into said backing member.

5. In an eccentric operated diaphragm valve, a backing member with a central threaded hole on the side remote from the diaphragm, an eccentric shaft, a ball ended connecting rod with an integral eccentric strap at the end remote from the ball co-acting with said eccentric, and an externally threaded longitudinally split cylindrical ball socket co-acting with the ball end of said connecting rod screwed into said backing member.

PHILIP KEITH SAUNDERS.